(12) United States Patent
Wang et al.

(10) Patent No.: US 9,720,643 B2
(45) Date of Patent: Aug. 1, 2017

(54) AUDIO MANAGEMENT METHOD AND APPARATUS

(71) Applicant: Huawei Device Co., Ltd., Shenzhen (CN)

(72) Inventors: Yahui Wang, Beijing (CN); Ke Jing, Nanjing (CN); Wenmei Gao, Beijing (CN); Shunan Fan, Beijing (CN); Xiaoqiang Lv, Beijing (CN)

(73) Assignee: Huawei Device Co., Ltd., Shenzhen (CN)

( * ) Notice: Subject to any disclaimer, the term of this patent is extended or adjusted under 35 U.S.C. 154(b) by 835 days.

(21) Appl. No.: 14/140,871

(22) Filed: Dec. 26, 2013

(65) Prior Publication Data
US 2014/0115479 A1 Apr. 24, 2014

Related U.S. Application Data

(63) Continuation of application No. PCT/CN2012/083160, filed on Oct. 18, 2012.

(51) Int. Cl.
*G06F 3/0481* (2013.01)
*G06F 3/16* (2006.01)
(Continued)

(52) U.S. Cl.
CPC ............ *G06F 3/167* (2013.01); *G06F 3/0481* (2013.01); *G06F 3/0484* (2013.01); *H04L 67/02* (2013.01); *H04L 67/322* (2013.01)

(58) Field of Classification Search
CPC ........ G06F 3/165; G06F 3/167; G06F 3/0481; G06F 3/0484; G06F 17/30902; G06F 1/309; B32B 1/08; H04B 1/7163
See application file for complete search history.

(56) References Cited

U.S. PATENT DOCUMENTS 5,574,514 A 11/1996 Tanihira et al.
5,826,031 A * 10/1998 Nielsen ............ G06F 17/30896
707/E17.118

(Continued)

FOREIGN PATENT DOCUMENTS

CN 101097139 A 1/2008
CN 101192203 A 6/2008
(Continued)

OTHER PUBLICATIONS

Dutton, S., et al., "Getting Started with WebRTC," XP055103693, Jul. 23, 2012, 31 pages.

(Continued)

*Primary Examiner* — Steven Sax
(74) *Attorney, Agent, or Firm* — Fish & Richardson P.C.

(57) ABSTRACT

An audio management method and apparatus, which relate to the field of communications technologies. The method includes: when it is detected that there is a first web page audio to be automatically played, determining whether there is an audio being played and whether a priority of the first web page audio is lower than a priority of the audio being played; when yes, intercepting automatic play of the first web page audio; otherwise, playing the first web page audio. A priority of a first web page audio to be automatically played and a priority of a web page audio being played are compared to decide whether to play the first web page audio, so that the problem of a conflict between web page audios is solved, and a user is not required to perform operations one by one.

19 Claims, 9 Drawing Sheets

(51) Int. Cl.
*G06F 3/0484* (2013.01)
*H04L 29/08* (2006.01)

(56) References Cited

U.S. PATENT DOCUMENTS

| | | | | |
|---|---|---|---|---|
| 8,165,091 | B2* | 4/2012 | Nix | H04L 29/125 370/331 |
| 8,296,783 | B1* | 10/2012 | Piira | G06F 1/329 719/328 |
| 2003/0073411 | A1* | 4/2003 | Meade, II | G06F 1/1613 455/70 |
| 2003/0140121 | A1* | 7/2003 | Adams | G06F 17/30902 709/219 |
| 2005/0047379 | A1* | 3/2005 | Boyden | H04B 1/7163 370/338 |
| 2006/0159877 | A1* | 7/2006 | Nomula | B32B 1/08 428/34.2 |
| 2006/0259585 | A1* | 11/2006 | Keohane | G06F 17/30899 709/219 |
| 2006/0259877 | A1* | 11/2006 | Kaminagayoshi | G06F 3/165 715/858 |
| 2008/0242280 | A1 | 10/2008 | Shapiro et al. | |
| 2009/0132942 | A1* | 5/2009 | Santoro | G06F 3/0481 715/765 |
| 2009/0249222 | A1* | 10/2009 | Schmidt | H04N 21/2368 715/751 |
| 2009/0307593 | A1 | 12/2009 | Chu | |
| 2011/0161485 | A1 | 6/2011 | George et al. | |
| 2011/0276396 | A1* | 11/2011 | Rathod | G06F 17/30867 705/14.49 |

FOREIGN PATENT DOCUMENTS

| | | |
|---|---|---|
| CN | 101349569 A | 1/2009 |
| CN | 101600015 A | 12/2009 |
| CN | 101701829 A | 5/2010 |
| CN | 102572060 A | 7/2012 |

OTHER PUBLICATIONS

Foreign Communication From a Counterpart Application, European Application No. 12878219.0, Extended European Search Report dated Sep. 16, 2014, 6 pages.
Partial English Translation and Abstract of Chinese Patent Application No. CN101701829A, Feb. 12, 2014, 4 pages.
Foreign Communication From a Counterpart Application, PCT Application No. PCT/CN2012/083160, English Translation of International Search Report dated Aug. 1, 2013, 3 pages.
Foreign Communication From a Counterpart Application, PCT Application No. PCT/CN2012/083160, Written Opinion dated Aug. 1, 2013, 5 pages.
Foreign Communication From a Counterpart Application, Chinese Application No. 201280021053.0, Chinese Office Action dated Dec. 8, 2015, 6 pages.

* cited by examiner

AUDIO MANAGEMENT METHOD AND APPARATUS

CROSS-REFERENCE TO RELATED APPLICATIONS

This application is a continuation of International Application No. PCT/CN2012/083160, filed on Oct. 18, 2012, which is hereby incorporated by reference in its entirety.

STATEMENT REGARDING FEDERALLY SPONSORED RESEARCH OR DEVELOPMENT

Not applicable.

REFERENCE TO A MICROFICHE APPENDIX

Not applicable.

FIELD OF THE INVENTION

The present invention relates to the field of communications technologies, and in particular, to an audio management method and apparatus.

BACKGROUND OF THE INVENTION

When opened, many web pages automatically play audios or videos with sound, for example, background music or advertisements, to attract the attention of a user. These media files with sound are generally called audios in the following. When browsing the Internet, a user may open multiple web pages simultaneously. If all the simultaneously opened web pages automatically play audios, the sound of multiple audios is mixed with the sound of a local audio that is possibly being played by the user, thereby producing a lot of noise. The user usually needs to find the pages playing the audios and stop the sound, which is very troublesome.

To avoid such phenomenon, a web page audio management method is provided in the prior art. In the method, automatic play of web page audios is avoided by intercepting a media file in a web page, thereby avoiding a sound conflict caused by simultaneous play of web page audios.

In the implementation of the present invention, the inventors find at least the following problem in the prior art.

After the foregoing web page audio management method is used, when web pages are opened, automatically played audios in all the web pages are intercepted and displayed as being in a pause state, and the user may click the audios again to play them, so the operations are troublesome.

SUMMARY OF THE INVENTION

In order to solve the problem in the prior art that all automatically played audios are intercepted so that troubles are brought to a user's operation, embodiments of the present invention provide an audio management method and apparatus. The technical solutions are as follows.

In one aspect, an embodiment of the present invention provides an audio management method, where the method includes: determining, when it is detected that there is a first web page audio to be automatically played, whether there is an audio being played; if yes, performing comparison to determine whether a priority of the first web page audio is lower than a priority of the audio being played; and if the priority of the first web page audio is lower than the priority of the audio being played, intercepting automatic play of the first web page audio; otherwise, playing the first web page audio.

Further, when the first web page audio is an audio of a Web real-time communication application, that it is detected that there is a first web page audio to be automatically played includes: that it is detected that a signaling state of a predetermined port number corresponding to an opened web page of the Web real-time communication application is a predetermined state.

When the first web page audio is an ordinary audio in a web page, that it is detected that there is a first web page audio to be automatically played includes: that it is detected that an instruction for automatically playing an audio exists in a currently loaded web page, where the ordinary audio is an audio that is different from the audio of the Web real-time communication application and is in the web page.

Further, the audio being played includes an audio of a Web real-time communication application.

Accordingly, the determining whether there is an audio being played includes: determining whether an opened web page includes a web page of the Web real-time communication application; and if yes, determining, according to a signaling state of a predetermined port number corresponding to the web page of the Web real-time communication application, whether there is an audio of the Web real-time communication application being played in the web page of the Web real-time communication application, or determining, by determining a PeerState attribute of a Peerconnection object, whether there is an audio of the Web real-time communication application being played in the web page of the Web real-time communication application.

Still further, the determining whether the opened web page includes the web page of the Web real-time communication application includes: detecting whether a port number of a server connected to the opened web page is a predetermined port number or falls within a predetermined port number range, where if yes, the opened web page includes the web page of the Web real-time communication application.

Preferably, the audio being played is a second web page audio, and the method further includes: when the priority of the first web page audio is higher than the priority of the second web page audio, pausing the second web page audio.

Preferably, the method further includes: in the process of playing the first web page audio or the second web page audio, detecting whether there is a local system audio started; and when there is a local system audio started and a priority of the local system audio is higher than the priority of the first web page audio or the second web page audio, pausing the first web page audio or the second web page audio.

Preferably, the method further includes: determining whether a web page corresponding to the paused first web page audio or second web page audio is changed into an active web page, and if yes, displaying an operation prompt to a user, where the operation prompt includes at least one of the following operation options: not playing the web page audio of the active web page and playing the web page audio of the active web page.

Preferably, after the automatic play of the first web page audio is intercepted, the method further includes: determining whether a web page corresponding to the first web page audio is changed into an active web page, and if yes, displaying an operation prompt to a user, where the operation prompt includes one or more of the following operation options: not playing the web page audio of the active web page, playing the web page audio of the active web page and pausing the web page audio being played, playing the web page audio of the active web page and decreasing the volume of the web page audio being played, and simultaneously playing the web page audio of the active web page and the audio being played.

Preferably, after the displaying the operation prompt to the user, the method further includes: obtaining an operation instruction that is given by the user according to the operation prompt, and executing an operation corresponding to the obtained operation instruction.

Preferably, the audio includes a web page audio and a local system audio, the web page audio includes an audio of a Web real-time communication application, and a priority of the audio of the Web real-time communication application is the highest.

In another aspect, an embodiment of the present invention provides an audio management apparatus, where the apparatus includes: a first detection module configured to detect whether there is a first web page audio to be automatically played; a first determining module configured to, when the first detection module detects that there is a first web page audio to be automatically played, determine whether there is an audio being played; a comparison module configured to, when the first determining module determines that there is an audio being played, perform comparison to determine whether a priority of the first web page audio is lower than a priority of the audio being played; and an execution module configured to, when the priority of the first web page audio is lower than the priority of the audio being played, intercept automatic play of the first web page audio; otherwise, play the first web page audio.

Specifically, the first web page audio includes an audio of a Web real-time communication application; the first detection module is specifically configured to determine whether an opened web page includes a web page of the Web real-time communication application, and if yes, detect whether a signaling state of a predetermined port number corresponding to the web page of the Web real-time communication application is a predetermined state, where if the signaling state of the predetermined port number is the predetermined state, there is an audio of the Web real-time communication application to be automatically played.

The first determining module is specifically configured to, when the first detection module detects that the signaling state of the predetermined port number is the predetermined state, determine whether there is an audio being played.

Specifically, the first web page audio includes an ordinary audio in a web page.

The first detection module is specifically configured to detect whether an instruction for automatically playing an audio exists in a currently loaded web page, where if the instruction for automatically playing an audio exists in the currently loaded web page, there is an ordinary audio to be automatically played, and the ordinary audio is an audio that is different from an audio of a Web real-time communication application and is in the web page.

The first determining module is specifically configured to, when the first detection module detects that the instruction for automatically playing an audio exists in the currently loaded web page, determine whether there is an audio being played.

Further, the audio being played includes an audio of a Web real-time communication application.

Accordingly, the first determining module is configured to determine whether an opened web page includes a web page of the Web real-time communication application; and if yes, determine, according to a signaling state of a predetermined port number corresponding to the web page of the Web real-time communication application, whether there is an audio of the Web real-time communication application being played in the web page of the Web real-time communication application, or determine, by determining a PeerState attribute of a Peerconnection object, whether there is an audio of the Web real-time communication application being played in the web page of the Web real-time communication application.

Still further, the first determining module is configured to: detect whether a port number connected to the opened web page is a predetermined port number or falls within a predetermined port number range, where if yes, the opened web page includes the web page of the Web real-time communication application.

Preferably, the audio being played is a second web page audio, and the execution module is further configured to, when the priority of the first web page audio is higher than the priority of the second web page audio, pause the second web page audio.

Preferably, the apparatus further includes: a second detection module configured to, in the process of playing the first web page audio or the second web page audio, detect whether there is a local system audio started.

The execution module is further configured to, when there is a local system audio started and a priority of the local system audio is higher than the priority of the first web page audio or the second web page audio, pause the first web page audio or the second web page audio.

Preferably, the apparatus further includes: a second determining module configured to determine whether a web page corresponding to the paused first web page audio or second web page audio is changed into an active web page; and a first prompt module configured to, when a determination result of the second determining module is yes, display an operation prompt to a user, where the operation prompt includes at least one of the following operation options: not playing the web page audio of the active web page and playing the web page audio of the active web page.

Preferably, the apparatus further includes: a third determining module configured to, after the automatic play of the first web page audio is intercepted, determine whether a web page corresponding to the first web page audio is changed into an active web page; and a second prompt module configured to, when a determination result of the third determining module is yes, display an operation prompt to a user, where the operation prompt includes one or more of the following operation options: not playing the web page audio of the active web page, playing the web page audio of the active web page and pausing the web page audio being played, playing the web page audio of the active web page and decreasing the volume of the web page audio being played, and simultaneously playing the web page audio of the active web page and the audio being played.

Preferably, the apparatus further includes: an obtaining module configured to obtain an operation instruction that is given by the user according to the operation prompt.

The execution module is further configured to execute an operation corresponding to the operation instruction obtained by the obtaining module.

The beneficial effects of the technical solutions according to the embodiments of the present invention are as follows: a priority of a first web page audio to be automatically played currently and a priority of an audio being played are compared, and it is decided, according to a comparison result, whether to play the first web page audio, so that a sound conflict between audios are automatically avoided, and a user is not required to perform operations one by one, thereby improving user experience.

BRIEF DESCRIPTION OF THE DRAWINGS

To describe the technical solutions in the embodiments of the present invention more clearly, the following briefly introduces the accompanying drawings required for describing the embodiments of the present invention. Apparently, the accompanying drawings in the following description show merely some embodiments of the present invention, and persons of ordinary skill in the art may still derive other drawings from these accompanying drawings without creative efforts.

DETAILED DESCRIPTION OF THE EMBODIMENTS

To make the objectives, technical solutions, and advantages of the present invention clearer, the following further describes the embodiments of the present invention in detail with reference to the accompanying drawings.

Embodiment 1

Figure 1:
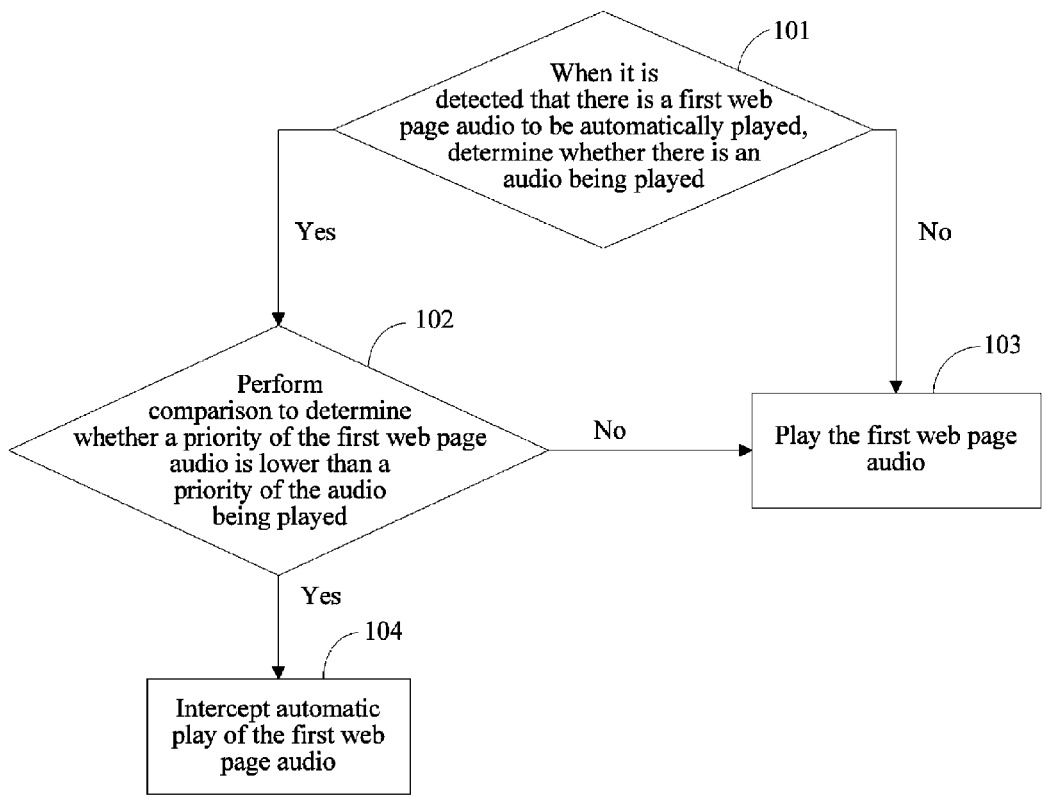
FIG. 1 is a flowchart of an audio management method according to Embodiment 1 of the present invention.

An embodiment of the present invention provides an audio management method. As shown in FIG. 1, the method includes:

Step 101: When it is detected that there is a first web page audio to be automatically played, determine whether there is an audio being played, and if yes, perform step 102; if not, perform step 103.

Specifically, in the embodiment of the present invention, the audio may be a web page audio, and may also be a local system audio. The web page audio includes an audio of a Web Real-Time Communication (WebRTC) application (for example, an incoming call ring and a call) and an ordinary audio in a web page. The ordinary audio is an audio that is different from the audio of the WebRTC application and is in the web page, for example, an online video and Moving Picture Experts Group (MPEG)-1 or MPEG-2 Audio Layer III (MP3) music. The first web page audio may be an audio of a WebRTC application or an ordinary audio.

Further, when the first web page audio is an ordinary audio in a web page, that it is detected there is a first web page audio to be automatically played includes: that it is detected that an instruction <audio autoplay> or <video autoplay> for automatically playing an audio exists in a currently loaded web page; when the first web page audio is an audio of a WebRTC application, that it is detected that there is a first web page audio to be automatically played includes: that it is detected that a signaling state of a predetermined port number corresponding to an opened web page of the WebRTC application is a predetermined state, for example, an incoming session request is received or a call is going on.

Step 102: Perform comparison to determine whether a priority of the first web page audio is lower than a priority of the audio being played, and if yes, perform step 104; if not, perform step 103.

Specifically, for web page audios, priorities may be classified according to audio types, for example, a priority of an incoming call ring of the WebRTC application is higher than a priority of an online video, and the priority of the online video is higher than a priority of MP3 music. For a local system audio, according to actual requirements, a priority of a web page audio (for example, an incoming call ring and call of the WebRTC application) that should not be affected by the local system audio is set higher than the priority of the local system audio, and priorities of other web page audios are set lower than the priority of the local system audio.

Step 103: Play the first web page audio.

Step 104: Intercept automatic play of the first web page audio.

Specifically, this step includes: disabling the instruction for automatically playing an audio in the web page.

In the embodiment of the present invention, a priority of a first web page audio to be automatically played currently and a priority of an audio being played are compared, and it is decided, according to a comparison result, whether to play the first web page audio, so that a sound conflict between audios are automatically avoided, and a user is not required to perform operations one by one, thereby improving user experience.

Embodiment 2

Figure 2:
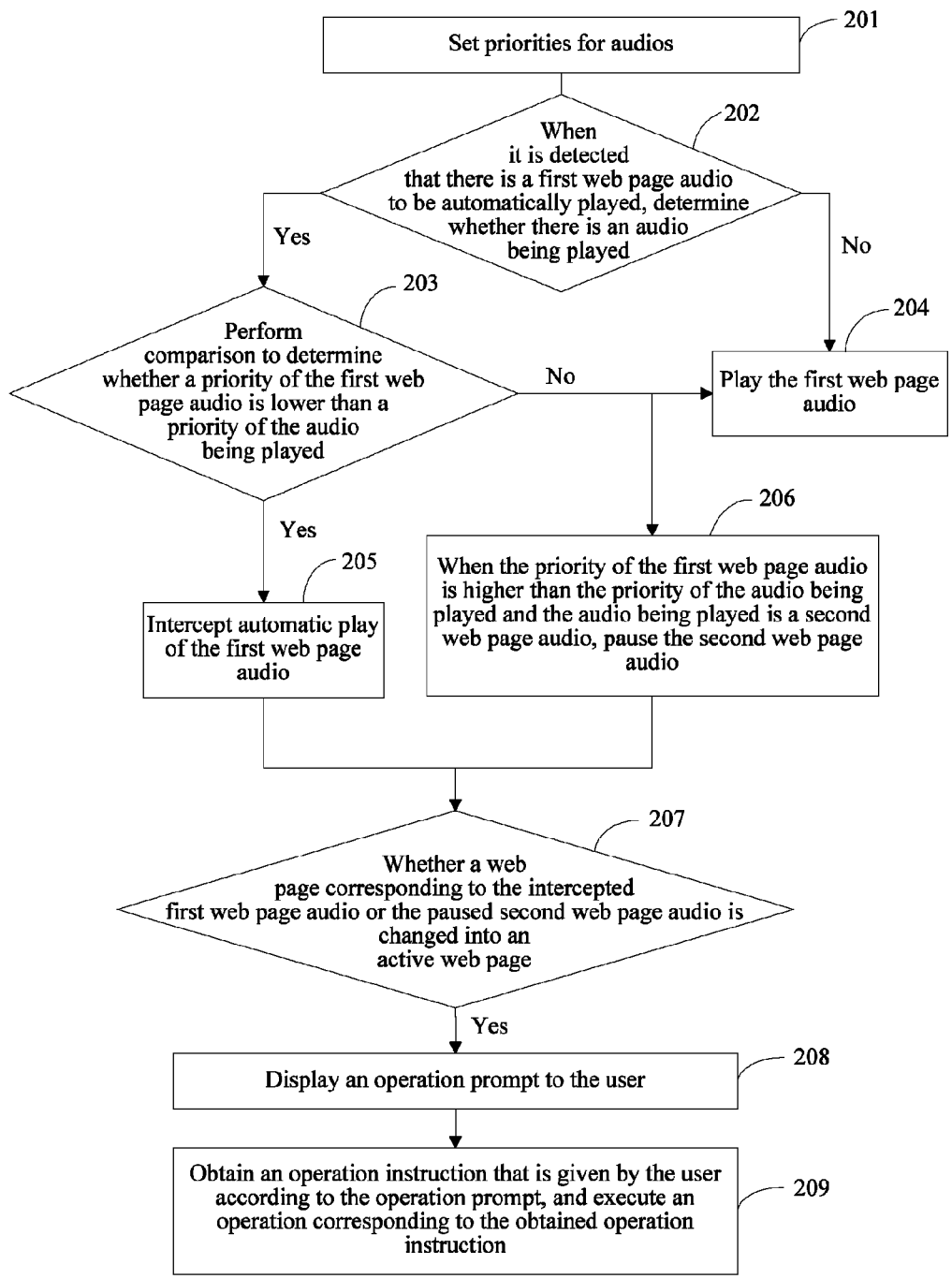
FIG. 2 is a flowchart of an audio management method according to Embodiment 2 of the present invention.

An audio management method provided in the present invention is described in detail in this embodiment through an example in which comprehensive management is performed on an audio of a WebRTC application, a local system audio, and an ordinary audio in a web page. As shown in FIG. 2, an embodiment of the present invention provides an audio management method, and the method includes:

Step 201: Set priorities for audios.

Specifically, in this embodiment, a priority of an audio of a WebRTC application is set the highest, followed by a priority of a local system, and a priority of an ordinary audio in a web page is set the lowest. For ordinary audios in web pages, a priority of an audio played earlier is higher than a priority of an audio played later.

Optionally, priorities of ordinary audios in web pages may also be set according to audio types, for example, a priority of an online video is higher than a priority of MP3 music.

It should be noted that this step is an optional step in which the setting may be performed according to an instruction of a user and may also be a default setting of the system.

Step 202: When it is detected that there is a first web page audio to be automatically played, determine whether there is an audio being played, and if yes, perform step 203; if not, perform step 204.

Specifically, when the first web page audio is an ordinary audio in a web page, that it is detected that there is a first web page audio to be automatically played includes: that it is detected that an instruction <audio autoplay> or <video autoplay> for automatically playing an audio exists in a currently loaded web page.

When the first web page audio is an audio of a WebRTC application, that it is detected that there is a first web page audio to be automatically played includes: that it is detected that a signaling state of a predetermined port number corresponding to an opened web page of the WebRTC application is a predetermined state, for example, an incoming session request is received or a call is going on.

Further, if a web page of the WebRTC application exists in the loaded web page, it is determined, by monitoring a signaling state of a predetermined port number or port number range corresponding to the web page of the WebRTC application, whether there is an audio of the WebRTC application to be played. Specifically, when the user opens the web page of the WebRTC application, the user usually needs to log in through his/her user name and definitely connects to a Web server. Through this process, an audio management apparatus can know whether the currently opened web page is the web page of the WebRTC application, and when determining that the current web page is the page of the WebRTC application, know a communication port number used by the web page of the WebRTC application; obtain, according to a signaling protocol used by the WebRTC application, a signaling state of the WebRTC application, for example, an incoming session request is received, a call is going on, or a call is ended; and determine, according to the signaling state, whether there is an audio of the WebRTC application to be played.

Further, the determining whether there is an audio being played may include the following steps.

Step A: Determine whether there is a web page audio being played. This step may include two aspects. In one aspect, it is determined whether there is an ordinary audio being played, and in another aspect, it is determined whether there is an audio of the WebRTC application being played.

Specifically, a web page audio play identifier may be set (for example, in FIG. 3A to FIG. 6, the web page audio play identifier is "audio stream", and audio stream=n, where n is an integer). It is determined, according to a value of the web page audio play identifier, whether there is an ordinary audio being played, and the value of the web page audio play identifier may be set by monitoring a state event of a media element. Further, in HyperText Markup Language (HTML) 5, the play, pause, and end of play of an audio (audio) and a video (video) each trigger a corresponding event, for example, a play event, a pause event, and an ended event. If a play event occurs, 1 is added to the value corresponding to the web page audio play identifier, and if a pause event and an ended event occur, 1 is subtracted from the value corresponding to the web page audio play identifier. In addition, for a volume change event, when a volume value is changed to 0, 1 is subtracted from the value corresponding to the web page audio play identifier, and when the volume value is changed from 0 to a value greater than 0, 1 is added to the value corresponding to the web page audio play identifier.

When the value of the web page audio play identifier is greater than or equal to 1, it indicates that there is an ordinary audio being played; otherwise, no ordinary audio is being played.

Specifically, the determining whether there is an audio of the WebRTC application being played includes: determining whether an opened web page includes a web page of the WebRTC application; and if yes, determining, according to a signaling state of a predetermined port number corresponding to the web page of the WebRTC application, whether there is an audio of the WebRTC application being played in the web page of the WebRTC application, or determining, by determining a PeerState attribute of a Peerconnection object, whether there is an audio being played in the web page of the WebRTC application (for example, it may be determined, according to the PeerState attribute, whether a call is going on, and if the call is going on, it may be determined that there is an audio of the WebRTC application being played in the web page of the WebRTC application).

A manner for determining whether the opened web page includes the web page of the WebRTC application may be: detecting whether a port number of a server connected to the opened web page is a predetermined port number or falls within a predetermined port number range, where if yes, it indicates that the web page is a web page of the Web real-time communication application, that is to say, the opened web page includes the web page of the WebRTC application; on the contrary, it indicates that the opened web page includes no web page of the WebRTC application; and therefore, no audio of the WebRTC application is being played.

More specifically, when it is determined, by determining the PeerState attribute of the Peerconnection object, whether there is an audio being played in the web page of the WebRTC application, it is determined first whether a Peerconnection object exists currently and whether the object contains a media stream, and if yes, it is monitored whether a PeerState attribute of the Peerconnection object is in an active or opening state. If the PeerState attribute of the Peerconnection object is in the active state, it indicates that the WebRTC application is performing an audio-video call; if the PeerState attribute of the Peerconnection object is in the opening state, it indicates that the WebRTC application is waiting for connection. Further, the state of the PeerState attribute is determined through a code in a browser engine.

Likewise, an RTC audio play identifier may also be set, so as to determine, according to a value of the RTC audio play identifier, whether there is an audio of the WebRTC application being played.

Step B: Determine whether there is a local system audio being played. Specifically, it may be known, through a system Application Programming Interface (API), whether there is a local system audio being played. Likewise, a local system audio play identifier may also be set to indicate whether there is a local system audio being played.

The execution sequence of step A and step B is not limited herein, and step A and step B may be executed simultaneously and may not be executed simultaneously.

Step 203: Perform comparison to determine whether a priority of the first web page audio is lower than a priority of the audio being played, and if yes, perform step 205; if not, perform step 204 and step 206.

Specifically, in this embodiment, according to priority setting in step 201, step 203 includes:

First step: Determine whether the first web page audio is an audio of a WebRTC application or an ordinary audio.

Whether the first web page audio is an audio of a WebRTC application may be determined by monitoring signaling interaction of a predetermined port number corresponding to a web page of the WebRTC application. For example, a port number of a server corresponding to the WebRTC application is usually fixed (which may be a fixed port and may also be a fixed port range). When a web page is loaded, whether the web page is a web page of the WebRTC application can be determined by parsing a port number of a server connected to the page. Whether the web page audio to be automatically played currently is an audio of the WebRTC application can be determined just by monitoring a signaling state of the port number.

Second step: If there is an audio being played currently, determine a priority of the audio being played currently.

Third step: According to the priorities set in step 201, compare the priority of the first web page and the priority of the audio being played.

Step 204: Play the first web page audio.

Step 205: Intercept automatic play of the first web page audio.

Specifically, in this embodiment, because the priority of the audio of the WebRTC application is the highest, what is paused herein can only be another web page audio, which may be implemented by disabling an instruction <audio autoplay> or <video autoplay> for automatically playing an audio in the web page.

Step 206: When the priority of the first web page audio is higher than the priority of the audio being played and the audio being played is a second web page audio, pause the second web page audio.

Specifically, it may be obtained, through step 202, whether the audio being played is a web page audio or a local system audio.

As seen from steps 203 to 206, when the priority of the first web page audio is higher than that of the second web page audio, the first web page audio is played (step 204) and the second web page audio is paused (step 206). When the priority of the first web page audio is equal to the priority of the audio being played, the two audios may be played simultaneously. For example, if there is a WebRTC call being performed currently and an incoming call ring of another WebRTC application arrives, because their priorities are the same, the incoming call ring may be played normally and the user chooses whether to connect the call. By deciding, according to the priorities, whether the first web page audio to be automatically played currently is automatically played and whether to pause the web page audio being played (if any), it may be avoided that a web page audio with a high priority (for example, an incoming call ring of the WebRTC application) cannot be played normally, and a sound conflict in audio play may be avoided to some extent.

Step 207: Determine whether a web page corresponding to the intercepted first web page audio or the paused second web page audio is changed into an active web page, and if yes, perform step 208; if not, the procedure of the embodiment of the present invention ends.

Step 208: Display an operation prompt to the user, where the operation prompt may include one or more of the following operation options: not playing the web page audio of the active web page, playing the web page audio of the active web page and pausing the web page audio being played, playing the web page audio of the active web page and decreasing the volume of the web page audio being played, and simultaneously playing the web page audio of the active web page and the audio being played.

Step 209: Obtain an operation instruction that is given by the user according to the operation prompt, and execute an operation corresponding to the obtained operation instruction.

Optionally, the method may further include: obtaining an operation instruction of the user according to a direct click of the user, and executing an operation corresponding to the obtained operation instruction.

Preferably, the method may further include: in the process of playing the first web page audio or the second web page audio, detecting whether there is a local system audio started.

When there is a local system audio started and a priority of the local system audio is higher than the priority of the first web page audio or the second web page audio, the first web page audio or the second web page audio is paused. In this way, a conflict between the local system audio and the web page audio may be avoided to some extent, thereby reducing operation steps of the user and improving user experience.

After the first web page audio or the second web page audio is paused because there is a local system audio started, the method further includes: determining whether a web page corresponding to the first web page audio or the second web page audio is changed into an active web page, and if yes, displaying an operation prompt to the user, where the operation prompt includes at least one of the following operation options: not playing the web page audio of the active web page and playing the web page audio of the active web page; and obtaining an operation instruction that is given by the user according to the operation prompt, and executing an operation corresponding to the obtained operation instruction.

In the embodiment of the present invention, a priority of a first web page audio to be automatically played currently and a priority of an audio being played are compared, and it is decided, according to a comparison result, whether to play the first web page audio, so that a sound conflict between audios is automatically avoided, and the user is not required to perform operations one by one, thereby improving user experience. In addition, in this embodiment, priorities are set for an audio of a WebRTC application, a local system audio, and an ordinary audio in a web page, and the priority of the audio of the WebRTC application is set the highest, and meanwhile, it is determined, according to a priority of an audio, whether the audio is played, so effects on the audio of the WebRTC application caused by intercepting all media files in the prior art are avoided, and the problem of a sound conflict between the web page audio and the local audio is solved to some extent.

Embodiment 3

Figure 3A:
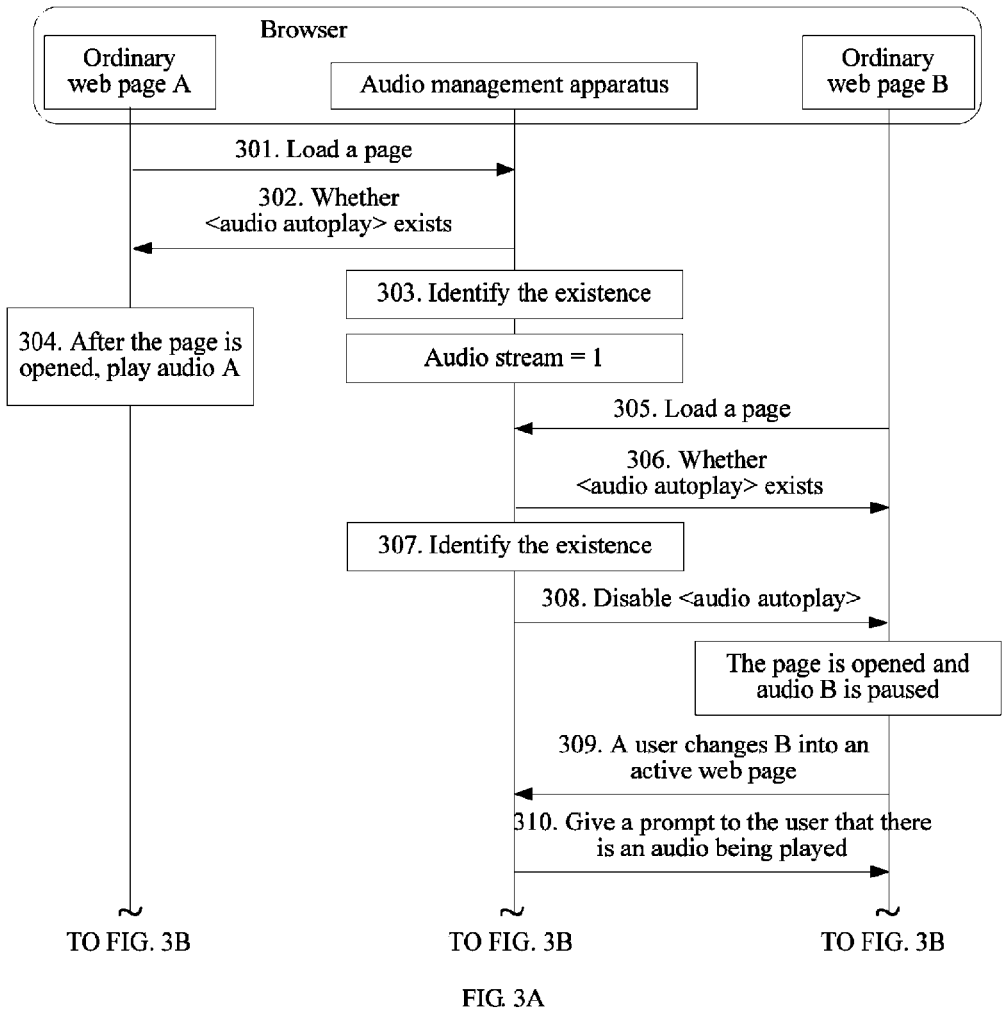
FIG. 3A and FIG. 3B are flowcharts of an audio management method according to Embodiment 3 of the present invention.
Figure 3B:
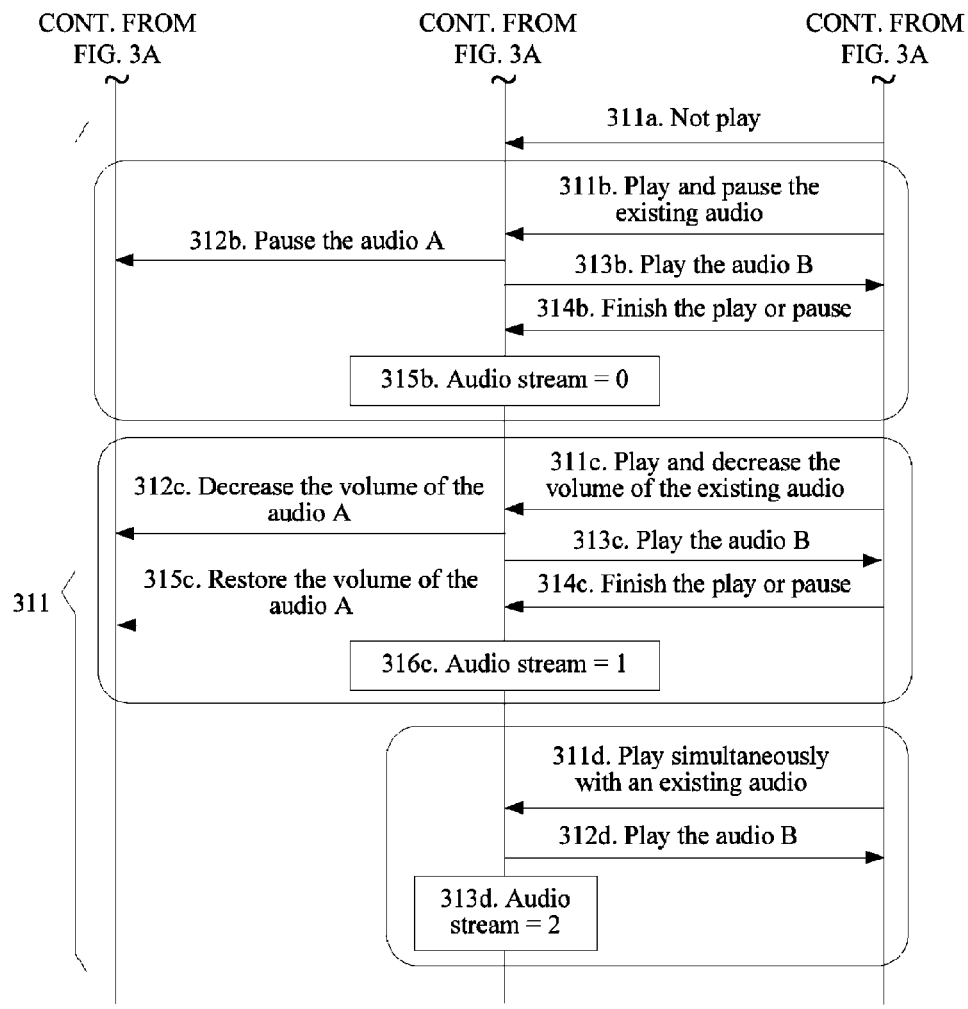

An audio management method provided in the present invention is described in this embodiment through an example in which a web page audio is managed. In this embodiment, a web page audio merely includes the foregoing ordinary audio in the web page, where priorities of ordinary audios in web pages are set according to a play sequence, that is to say, a priority of an audio played earlier is higher than a priority of an audio played later. Before the procedure of this embodiment starts, an application environment of the procedure of this embodiment is as follows: a browser is opened, an audio management apparatus (see Embodiment 7 and Embodiment 8) is initialized, a web page audio play identifier is set to 0, and no ordinary audio is being played currently. As shown in FIG. 3A and FIG. 3B, an embodiment of the present invention provides an audio management method, and the method includes:

Step 301: Load a page of an ordinary web page A.

The ordinary web page refers to a web page other than a web page of a WebRTC application.

Step 302: Parse the ordinary web page A to find whether an instruction <audio autoplay> or <video autoplay> for automatically playing an audio exists in the ordinary web page A.

Step 303: Identify that the instruction <audio autoplay> or <video autoplay> for automatically playing an audio exists in the ordinary web page A, determine that no audio is being played, and perform step 304.

Because the network audio play identifier is 0 before it is identified that the instruction for automatically playing an audio exists in the ordinary web page A, it can be known that no web page audio is being played currently. Because the priorities are set according to the play sequence in this embodiment, a priority of an audio (audio A) in the ordinary web page A is the highest, and step 304 is performed.

Step 304: After the page of the ordinary web page A is opened, play the audio A.

At this time, the audio management apparatus changes the web page audio play identifier to 1 (that is, audio stream=1 in the drawing).

Step 305: Load a page of an ordinary web page B.

Step 306: Parse the ordinary web page B to find whether an instruction <audio autoplay> or <video autoplay> for automatically playing an audio exists in the ordinary web page B.

Step 307: Identify that the instruction <audio autoplay> or <video autoplay> for automatically playing an audio exists in the ordinary web page B, and compare priorities of the audio A and an audio B.

Specifically, because the priorities are set according to the play sequence in this embodiment, the priority of the audio A is higher than a priority of the audio B. In a case that a current web page audio play identifier is 1, it can be obtained that the priority of the web page audio to be automatically played currently (audio B) is lower than the priority of the audio being played (audio A), and step 308 is performed.

Step 308: Disable the instruction <audio autoplay> or <video autoplay> for automatically playing an audio in the ordinary web page B.

After the instruction <audio autoplay> or <video autoplay> for automatically playing an audio is disabled, an automatically played audio in the ordinary web page B cannot be automatically played. At this time, the page of the ordinary web page B is opened and the audio (audio B) of the page is intercepted.

Step 309: Detect that a user changes the ordinary web page B into an active web page.

Step 310: Give a prompt to the user that there is an audio being played.

Specifically, the following operation options may be displayed to the user: not playing the web page audio of the active web page, playing the web page audio of the active web page and pausing the audio being played, playing the web page audio of the active web page and decreasing the volume of the audio being played, and simultaneously playing the web page audio of the active web page and the audio being played.

Step 311: Obtain an operation instruction that is given by the user according to the operation prompt, and execute an operation corresponding to the obtained operation instruction.

Specifically, in this embodiment, step 311 includes the following four cases.

First case: Obtain an operation instruction of the user, where the operation instruction is not playing the web page audio of the active web page, then, perform no operation (step 311a).

Second case: Obtain an operation instruction of the user, where the operation instruction is playing the web page audio of the active web page and pausing the audio being played (step 311b); pause the audio A (step 312b); play the audio B (step 313b); detect that the audio B finishes playing or is paused (step 314b); and at this time, the web page audio play identifier is changed to 0 (step 315b).

Third case: Obtain an operation instruction of the user, where the operation instruction is playing the web page audio of the active web page and decreasing the volume of the audio being played (step 311c); decrease the volume of the audio A (step 312c); play the audio B (step 313c); detect that the audio B finishes playing or is paused (step 314c); restore the volume of the audio A (step 315c); and at this time, the web page audio play identifier is still 1 (step 316c).

Fourth case: Obtain an operation instruction of the user, where the operation instruction is simultaneously playing the web page audio of the active web page and the audio being played (step 311d); play the audio B (step 312d); and at this time, the web page audio play identifier is changed to 2 (step 313d).

Accordingly, after the operation instruction of the user is executed, update setting may be performed on the web page audio play identifier by using the method in step 202 of Embodiment 2.

It should be noted that priorities of audios of ordinary web pages (that is, other web page audios) may also be set according to audio types.

In the embodiment of the present invention, a priority of a first web page audio to be automatically played currently and a priority of a web page audio being played are compared, and it is determined, according to a comparison result, whether to play the first web page audio, so that a sound conflict between audios is automatically avoided, and the user is not required to perform operations one by one, thereby improving user experience.

Embodiment 4

Figure 4:
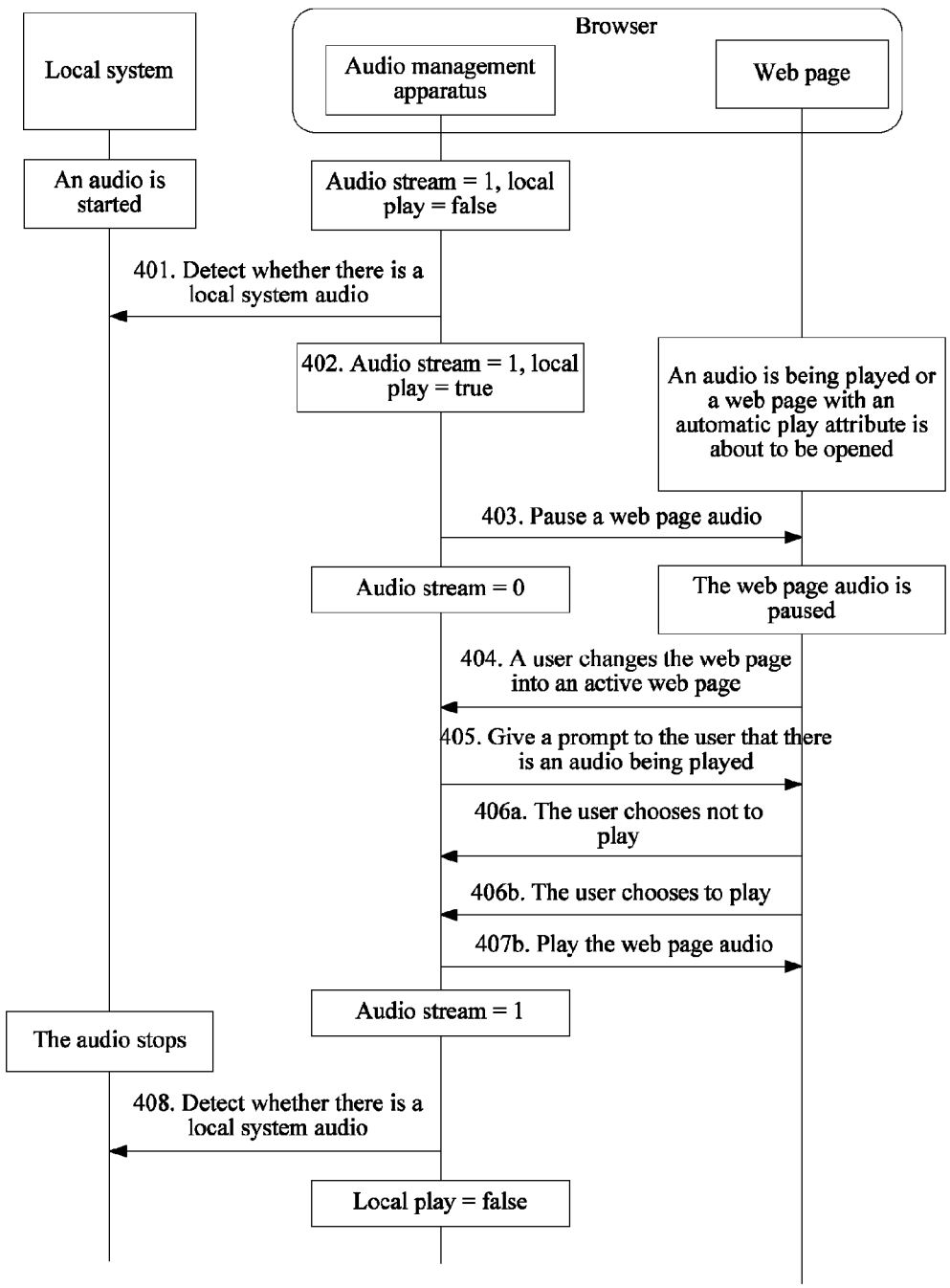
FIG. 4 is a flowchart of an audio management method according to Embodiment 4 of the present invention.

An audio management method provided in the present invention is described in this embodiment through an example in which a web page audio and a local system audio are managed. In this embodiment, a priority of the web page audio is lower than a priority of the local system audio. Before the procedure of this embodiment starts, an application environment of the procedure of this embodiment is as follows: a browser is opened, and in a case that there is a web page audio being played or that there is a web page audio to be automatically played, there is a local system audio to be started. At this time, an audio management apparatus sets a web page audio play identifier to 1 (that is, audio stream=1 in the drawing), and sets a local system audio play identifier to false (that is, local play=false in FIG. 4, indicating that no local system audio is played). As shown in FIG. 4, an embodiment of the present invention provides an audio management method, and the method includes:

Step 401: Detect whether there is a local system audio being played.

The method for detecting a local system audio has been described in detail in FIG. 2, and is not described herein again.

Step 402: Detect that there is a local system audio being played, and set the local system audio play identifier to true (that is, local play=true in the drawing, indicating that there is a local system audio being played).

Step 403: Pause a web page audio.

After the web page audio is paused, the audio management apparatus sets the web page audio play identifier to 0.

Step 404: After the web page audio is paused, detect that a user changes the web page into an active web page.

Step 405: Give a prompt to the user that there is an audio being played, and provide the following operation options to the user: not playing the web page audio of the active web page and playing the web page audio of the active web page.

If the user chooses not to play the web page audio of the active web page, perform step 406a; if the user chooses to play the web page audio of the active web page, perform step 406b.

Step 406a: Obtain an operation instruction of the user, where the operation instruction is not playing the web page audio of the active web page, then, perform no operation.

Step 406b: Obtain an operation instruction of the user, where the operation instruction is playing the web page audio of the active web page, then, perform step 407b.

Step 407b: Play the web page audio.

At this time, the audio management apparatus changes the web page audio play identifier to 1.

Step 408: Detect whether there is a local system audio being played.

In the process of playing the web page audio, it is still detected whether there is a local system audio being played. When the local system audio stops, the audio management apparatus detects that no local system audio is being played, and sets the local system audio play identifier to false.

In the embodiment of the present invention, a priority of a first web page audio to be automatically played currently and a priority of a local system audio being played are compared, and it is decided, according to a comparison result, whether to play the first web page audio, so that a sound conflict between audios is automatically avoided, and the user is not required to perform operations one by one, thereby improving user experience.

Embodiment 5

Figure 5:
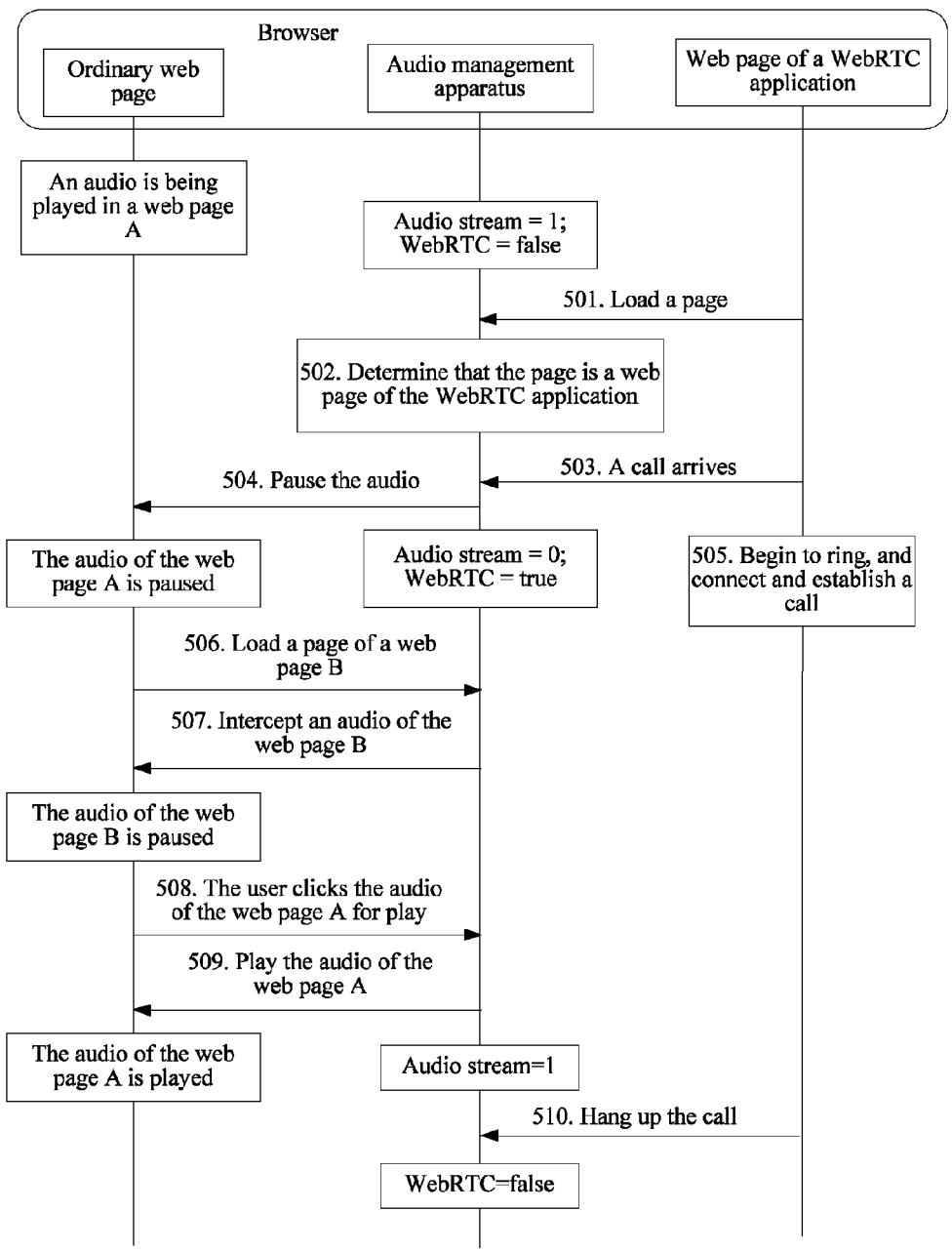
FIG. 5 is a flowchart of an audio management method according to Embodiment 5 of the present invention.

An audio management method provided in the present invention is described in this embodiment through an example in which a web page audio (including an audio of a WebRTC application and an ordinary audio in a web page) is managed. In this embodiment, a priority of an audio of a WebRTC application is the highest by default, and a web page A and a web page B in the drawing are ordinary web pages. Before the procedure of this embodiment starts, an application environment of the procedure of this embodiment is as follows: the web page A in a browser is opened, and there is an audio of the web page A being played; at the same time, no web page of the WebRTC application is opened. At this time, an audio management apparatus sets a web page audio play identifier to 1 (that is, audio stream=1 in the drawing), and sets an RTC play identifier to false (that is, WebRTC=false in the drawing, indicating that no audio of the WebRTC is being played). As shown in FIG. 5, an embodiment of the present invention provides an audio management method, and the method includes:

Step 501: Load a page.

Step 502: Determine, through parsing, that the currently loaded page is a web page of the WebRTC application.

Step 503: Detect that a call arrives at the web page of the WebRTC application.

Specifically, whether a call arrives may be detected by detecting signaling interaction of a predetermined port, which has been described in detail in Embodiment 2, and is not described herein again.

Step 504: Pause the audio of the web page A.

At this time, the web page audio play identifier is set to 0 (that is, audio stream=0 in the drawing), and the WebRTC play identifier is set to true (that is, WebRTC=true in the drawing, indicating that there is an audio being played in the web page of the WebRTC application).

Because the priority of the audio of the WebRTC application is the highest by default in this embodiment, the priority of an audio of the web page A is lower than the priority of the audio of the WebRTC application and the audio of the web page A is paused.

Step 505: The WebRTC application in the web page of the WebRTC application begins to ring, and connects and establishes a call.

Because the priority of the audio of the WebRTC application is the highest by default in this embodiment, the priority of the audio of the web page A is lower than the priority of the audio of the WebRTC application, and a ring of the WebRTC application is played upon arrival of the call.

Step 506: Load a page of the web page B.

During the call, the user also opens the web page B, so it is required to load the web page B. Because the web page B is an ordinary web page and the priority of the audio of the WebRTC application is the highest by default in this embodiment, the priority of the audio of the web page B is lower than the priority of the audio of the WebRTC application, and step 507 is performed.

Step 507: Intercept automatic play of the audio of the web page B.

Specifically, this step includes: disabling an instruction <audio autoplay> or <video autoplay> for automatically playing an audio in the web page B.

Step 508: Obtain an operation instruction of the user, where the operation instruction is playing the audio of the web page A.

Specifically, in this embodiment, the user gives the operation instruction by directly clicking the audio of the web page A.

Step 509: Play the audio of the web page A, and set the web page audio play identifier to 1.

Step 510: Hang up the call, and set the RTC play identifier to false.

In the embodiment of the present invention, a priority of a first web page audio to be automatically played currently and a priority of an audio being played are compared, and it is decided, according to a comparison result, whether to play the first web page audio, so that a sound conflict between audios is automatically avoided, and the user is not required to perform operations one by one, thereby improving user experience. In this embodiment, the priority of the audio of the WebRTC application is the highest. Therefore, if the user is making a WebRTC call and opens an ordinary web page during the call, other web page audios embedded in the ordinary web page cannot be automatically played, unless the user chooses to play other web page audios to the other party of the call, thereby automatically avoiding interference of other web page audios with the call process.

Embodiment 6

Figure 6:
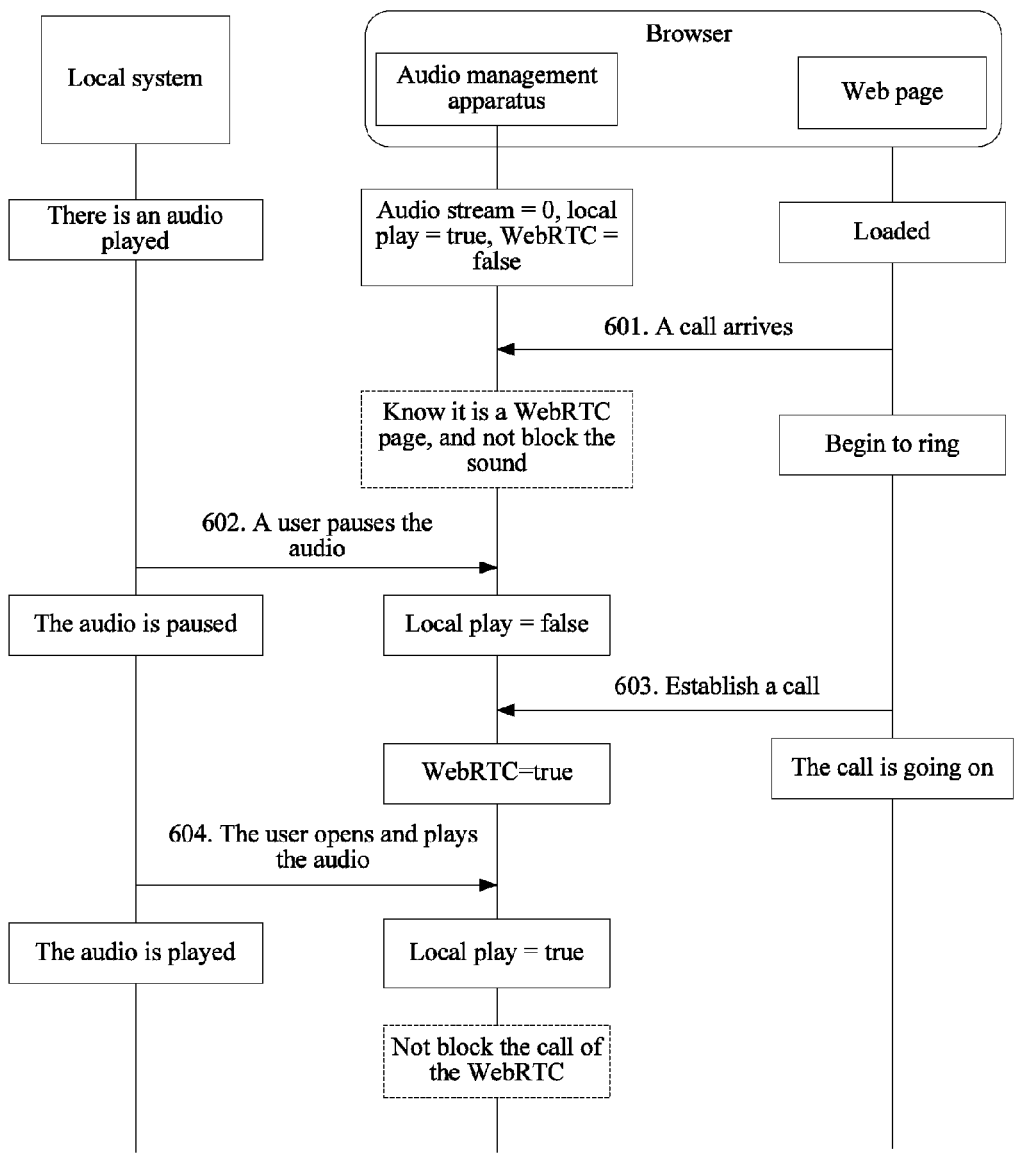
FIG. 6 is a flowchart of an audio management method according to Embodiment 6 of the present invention.

An audio management method provided in the present invention is described in this embodiment through an example in which a web page audio and a local system audio are managed. In this embodiment, a priority of the web page audio (an audio of a WebRTC application) is higher than a priority of the local system audio. Before the procedure of this embodiment starts, an application environment of the procedure of this embodiment is as follows: a web page of a WebRTC application is opened in a browser, no ordinary web page is opened, and at the same time, there is a local system audio being played. At this time, in an audio management apparatus, a web page audio play identifier is set to 0 (that is, audio stream=0 in the drawing), a local system audio play identifier is set to true (that is, local play=true in the drawing), and a WebRTC play identifier is set to false (that is, WebRTC=false in the drawing, indicating that no audio of the WebRTC application is being played). As shown in FIG. 6, an embodiment of the present invention provides an audio management method, and the method includes:

Step 601: Detect that a call arrives at a loaded web page of the WebRTC application.

Specifically, whether a call arrives may be detected by detecting signaling interaction of a predetermined port, which has been described in detail in Embodiment 2, and is not described herein again.

Because a priority of an audio of the WebRTC application is higher than the priority of the local system audio, the audio management apparatus does not block a call of the WebRTC application when there is a local system audio being played.

Accordingly, the WebRTC application begins to ring.

Step 602: Detect that the local system audio stops, and set the local system audio play identifier to false.

Usually, when a call arrives, the user actively stops the local system audio, so as not to affect the call.

Step 603: The WebRTC application establishes a call, and the WebRTC play identifier is set to true, that is, WebRTC=true.

Step 604: Detect that there is the local system audio being played, and set the local system play identifier to true.

Because the priority of the audio of the WebRTC application is higher than the priority of the local system audio, the audio management apparatus does not block the call of the WebRTC application when there is a local system audio being played. At this time, the local system audio and the call of the WebRTC application are performed simultaneously.

In the embodiment of the present invention, a priority of a first web page audio to be automatically played currently and a priority of an audio being played are compared, and it is decided, according to a comparison result, whether to play the first web page audio, so that a sound conflict between audios is automatically avoided, and the user is not required to perform operations one by one, thereby improving user experience. Meanwhile, the priority of the audio of the WebRTC application is set higher than the priority of the local system audio. Therefore, during a call, the play of the local system audio does not affect or block the call.

Embodiment 7

Figure 7:
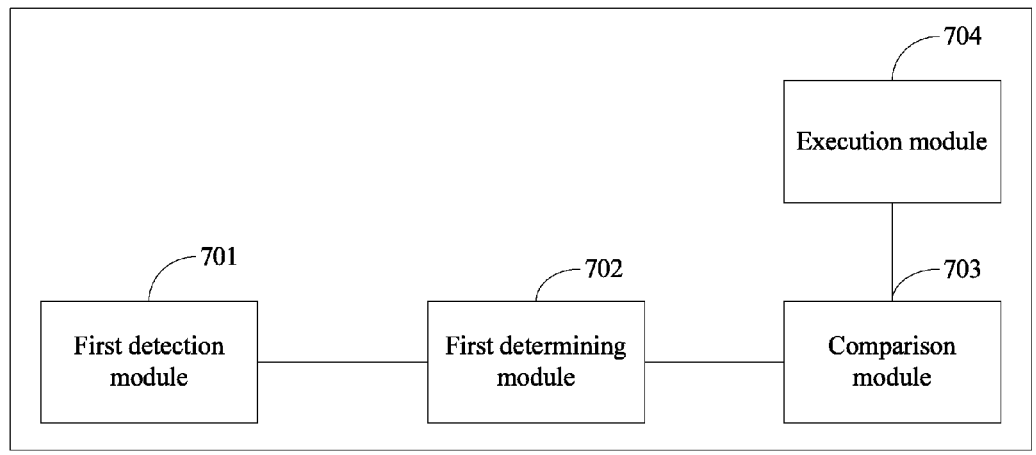
FIG. 7 is a structural block diagram of an audio management apparatus according to Embodiment 7 of the present invention.

An embodiment of the present invention provides an audio management apparatus. As shown in FIG. 7, the apparatus includes: a first detection module 701 configured to detect whether there is a first web page audio to be automatically played; a first determining module 702 configured to, when the first detection module 701 detects that there is a first web page audio to be automatically played, determine whether there is an audio being played; a comparison module 703 configured to, when the first determining module 702 determines that there is an audio being played, perform comparison to determine whether a priority of the first web page audio is lower than a priority of the audio being played; and an execution module 704 configured to, when the priority of the first web page audio is lower than the priority of the audio being played, intercept automatic play of the first web page audio; otherwise, play the first web page audio.

Specifically, in the embodiment of the present invention, the audio may be a web page audio, and may also be a local system audio. The web page audio includes, but is not limited to, an audio of a WebRTC application (for example, an incoming call ring and a call) and an ordinary audio in a web page (for example, an online video and MP3 music).

Specifically, for web page audios, priorities may be classified according to audio types, for example, an incoming call ring of the WebRTC application is higher than an online video, and the online video is higher than MP3 music. For a local system audio, according to actual requirements, a priority of a web page audio (for example, an incoming call ring and call of the WebRTC application) that should not be affected by the local system audio is set higher than the priority of the local system audio, and priorities of other web page audios are set lower than the priority of the local system audio.

Further, the first web page audio includes an audio of a WebRTC application, and the first detection module 701 is specifically configured to determine whether the opened web page includes a web page of the WebRTC application; and if yes, detect whether a signaling state of a predetermined port number corresponding to the web page of the WebRTC application is a predetermined state, where if the signaling state of the predetermined port number is the predetermined state, there is an audio of the Web real-time communication application to be automatically played.

Accordingly, the first determining module 702 is specifically configured to, when the first detection module 701 detects that the signaling state of the predetermined port number is the predetermined state, determine whether there is an audio being played.

Still further, the first web page audio includes an ordinary audio in a web page; the first detection module 701 is specifically configured to detect whether an instruction for automatically playing an audio exists in a currently loaded web page, where if the instruction for automatically playing an audio exists in the currently loaded web page, there is an ordinary audio to be automatically played.

Accordingly, the first determining module 702 is specifically configured to, when the first detection module 701 detects that the instruction for automatically playing an audio exists in the currently loaded web page, determine whether there is an audio being played. The ordinary audio in the web page is an audio different from the audio of the WebRTC application.

Further, when the audio being played includes an audio of a WebRTC application, the first determining module 702 is configured to determine whether an opened web page includes a web page of the WebRTC application; and if yes, determine, according to a signaling state of a predetermined port number corresponding to the web page of the WebRTC application, whether there is an audio of the WebRTC application being played in the web page of the WebRTC application, or determine, by determining a PeerState attribute of a Peerconnection object, whether there is an audio of the WebRTC application being played in the web page of the WebRTC application.

Still further, the first determining module 702 is configured to detect whether a port number connected to the opened web page is a predetermined port number or falls within a predetermined port number range, where if yes, the opened web page includes the web page of the WebRTC application.

In the embodiment of the present invention, a priority of a first web page audio to be automatically played currently and a priority of an audio being played are compared, and it is decided, according to a comparison result, whether to play the first web page audio, so that a sound conflict between audios is automatically avoided, and the user is not required to perform operations one by one, thereby improving user experience.

Embodiment 8

Figure 8:
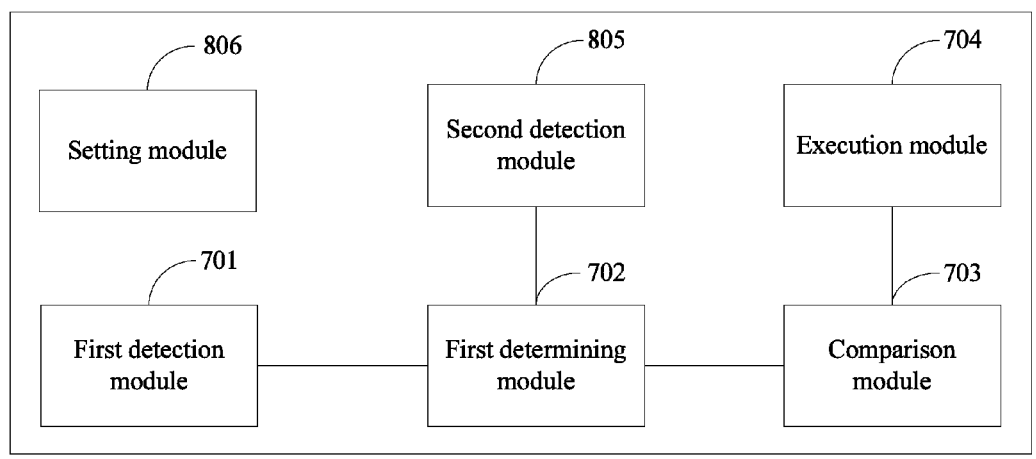
FIG. 8 is a structural block diagram of an audio management apparatus according to Embodiment 8 of the present invention.

An embodiment of the present invention provides an audio management apparatus. As shown in FIG. 8, the apparatus is different from the apparatus provided in Embodiment 7 in that an audio being played is a second web page audio, and the execution module 704 is further configured to, when the priority of the first web page audio is higher than the priority of the audio being played, pause the second web page audio.

Further, the apparatus further includes a second detection module 805 configured to, in the process of playing the first web page audio or the second web page audio, detect whether there is a local system audio started.

The execution module 704 is further configured to, when there is a local system audio started and a priority of the local system audio is higher than the priority of the first web page audio or the second web page audio, pause the first web page audio or the second web page audio.

Preferably, the apparatus further includes: a setting module 806 configured to set priorities for audios.

Specifically, the setting module 806 is configured to set a priority of an audio of a WebRTC application the highest.

Specifically, in this embodiment, the audio may include a web page audio and a local system audio, and the web page audio includes an audio of a Web real-time communication application and other web page audios, and the priority of the audio of the Web real-time communication application is the highest.

In the embodiment of the present invention, a priority of a first web page audio to be automatically played currently and a priority of an audio being played are compared, and it is decided, according to a comparison result, whether to play the first web page audio, so that a sound conflict between audios is automatically avoided, and the user is not required to perform operations one by one, thereby improving user experience. In addition, in this embodiment, priorities are set for an audio of a WebRTC application, a local system audio, and an ordinary audio in a web page, and the priority of the audio of the WebRTC application is set the highest, and meanwhile, it is determined, according to a priority of an audio, whether the audio is played, so effects on the audio of the WebRTC application caused by intercepting all media files in the prior art are avoided, and the problem of a sound conflict between the web page audio and the local audio is solved to some extent.

Embodiment 9

Figure 9:
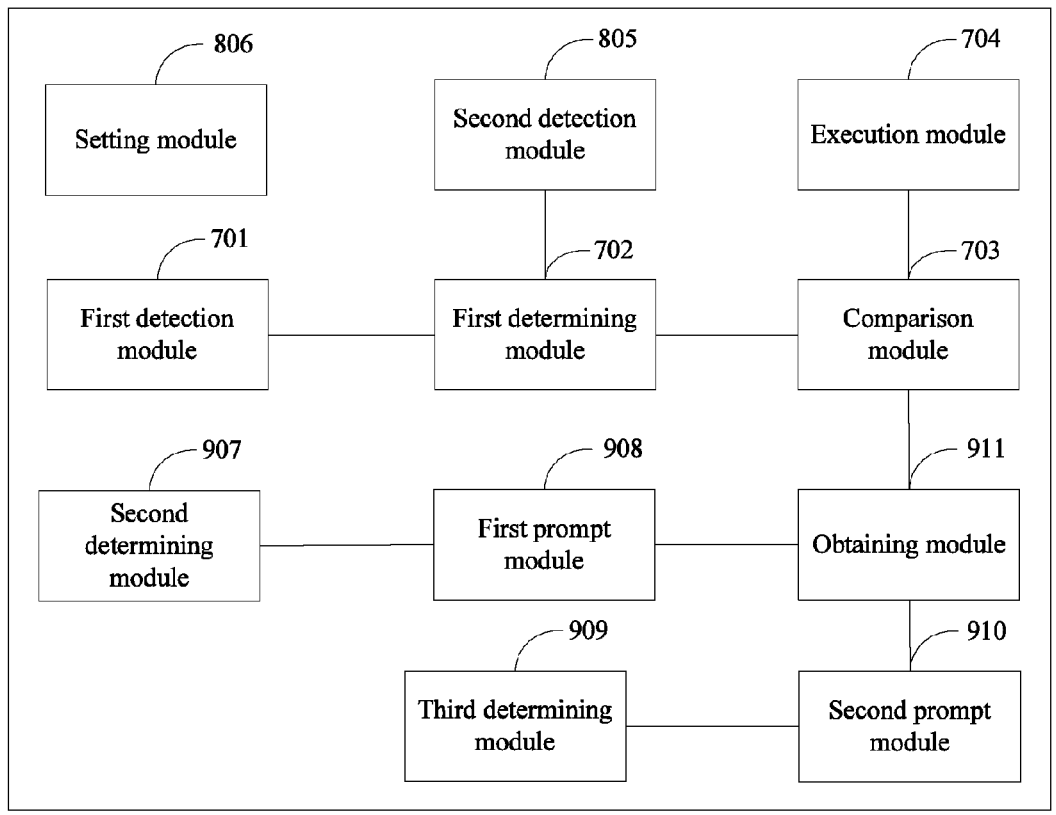
FIG. 9 is a structural block diagram of an audio management apparatus according to Embodiment 9 of the present invention.

An embodiment of the present invention provides an audio management apparatus. As shown in FIG. 9, the apparatus is different from the apparatus provided in Embodiment 8 in that the apparatus according to this embodiment further includes: a second determining module 907 configured to determine whether a web page corresponding to the paused first web page audio or second web page audio is changed into an active web page; and a first prompt module 908 configured to, when a determination result of the second determining module 907 is yes, display an operation prompt to a user, where the operation prompt includes at least one of the following operation options: not playing the web page audio of the active web page and playing the web page audio of the active web page.

Preferably, the apparatus further includes: a third determining module 909 configured to, after the automatic play of the first web page audio is intercepted, determine whether a web page corresponding to the first web page audio is changed into an active web page; and a second prompt module 910 configured to, when a determination result of the third determining module 909 is yes, display an operation prompt to the user, where the operation prompt includes one or more of the following operation options: not playing the web page audio of the active web page, playing the web page audio of the active web page and pausing the web page audio being played, playing the web page audio of the active web page and decreasing the volume of the web page audio being played, and simultaneously playing the web page audio of the active web page and the audio being played.

Further, the apparatus further includes: an obtaining module 911 configured to obtain an operation instruction that is given by the user according to the operation prompt.

The execution module 704 is further configured to execute an operation corresponding to the operation instruction obtained by the obtaining module 911.

It should be noted that the operation prompt herein may be obtained through the first prompt module 908 and may also be obtained through the second prompt module 910.

Preferably, the obtaining module 911 may directly obtain the operation instruction that is given by the user by clicking the web page audio.

In the embodiment of the present invention, a priority of a first web page audio to be automatically played currently and a priority of an audio being played are compared, and it is decided, according to a comparison result, whether to play the first web page audio, so that a sound conflict between audios is automatically avoided, and the user is not required to perform operations one by one, thereby improving user experience.

The apparatus provided in Embodiments 7, 8, and 9 may be arranged in a browser.

Figure 10:
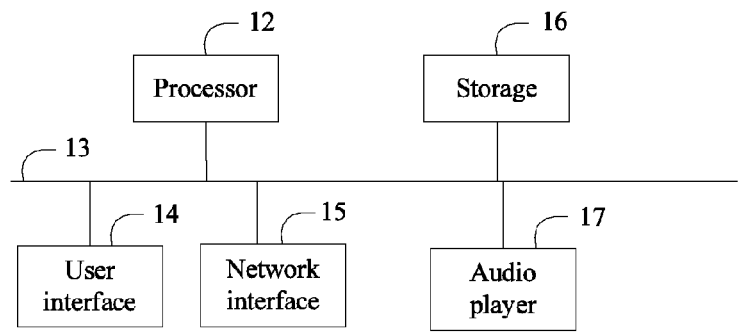
FIG. 10 is a schematic structural diagram of a specific implementation manner of the audio management apparatus according to Embodiments 7, 8, and 9 of the present invention.

In a specific implementation manner, the audio management apparatus in FIG. 7, FIG. 8, and FIG. 9 may be a computer (including a hand-held computer system, such as a smart phone and a tablet computer) or a server, as shown in FIG. 10. The computer 10 generally includes at least one processor 12 (for example, a central processing unit (CPU)), a user interface 14, at least one network interface 15 or other communication interface, a storage 16, an audio player 17, and at least one communication bus 13. Persons skilled in the art may understand that the structure of the computer shown in FIG. 10 does not constitute a limitation on the computer, and the computer may include more or less components than those shown in FIG. 10, or has a combination of some components, or has different layouts of the components.

The components of the computer 10 are specifically described in the following with reference to FIG. 10.

The communication bus 13 is configured to implement connection and communication between the processor 12, the storage 16, and the communication interface.

The at least one network interface 15 (which may be wired or wireless) implements communication connection between the computer 10 and at least one other computer, where the Internet, a wide area network, a local area network, a metropolitan area network, or the like may be used.

The storage 16 may be configured to store a software program and an application module, and the processor 12 executes various function applications of the computer 10 and data processing by running the software program and the application module stored in the storage 16. The storage 16 mainly includes a program storage area and a data storage area, where the program storage area may store an operating system and an application program required by at least one function (for example, a sound play function and an image play function); and the data storage area may store data (for example, audio data) that is created according to the usage of the computer 10. In addition, the storage 16 may include a high-speed Random Access Memory (RAM), and may further include a non-volatile memory, for example, at least one magnetic disk storage device, a flash memory device, or another volatile solid state storage device.

The user interface 14 includes, but is not limited to, a display and an input device. The input device usually includes a keyboard and a click device (for example, a mouse, a trackball, a touch panel, or a touch screen). The display may be configured to display information input by the user or information provided to the user, various menus of the computer 10, pictures or images in videos, and the like. The keyboard and the click device may be configured to receive input digit or character information, and generate a signal input related to user setting and function control of the computer 10, for example, to receive a setting command related to a priority of an audio and obtain an operation instruction that is given by the user according to an operation prompt.

The audio player 17 may include, but is not limited to, an audio circuit (for example, a sound card) and a sound device. The audio player 17 may, under the control of the processor 12, output an electrical signal, into which received audio data is converted, to the sound device such as an earphone, a loudspeaker, an amplifier, and a recorder, and the sound device converts the electrical signal into a sound signal for output.

The processor 12 is the control center of the computer 10, connects various parts of the whole computer by using various interfaces and lines, and executes various functions of the computer 10 and processes data by running or executing a software program and/or an application module stored in the storage 16 and invoking data stored in the storage 16, so as to monitor the whole computer 10.

Specifically, by running or executing the software program and/or the application module stored in the storage 16 and invoking data stored in the storage 16, the processor 12 may detect whether there is a first web page audio to be automatically played; when it is detected that there is a first web page audio to be automatically played, determine whether there is an audio being played; if yes, perform comparison to determine whether a priority of the first web page audio is lower than a priority of the audio being played; if the priority of the first web page audio is lower than the priority of the audio being played, control the audio player 17 to intercept automatic play of the first web page audio; otherwise, control the audio player 17 to play the first web page audio. It is easily known that, if the first web page audio has an image, it is further required to control the display to display the related image.

Further, when the first web page audio includes an audio of a WebRTC application, the processor 12 may determine whether an opened web page includes a web page of the WebRTC application; if yes, detect whether a signaling state of a predetermined port number corresponding to the web page of the WebRTC application is a predetermined state; and when it is detected that the signaling state of the predetermined port number is the predetermined state, determine whether there is an audio being played. If the signaling state of the predetermined port number is the predetermined state, there is an audio of the Web real-time communication application to be automatically played.

Still further, when the first web page audio includes an ordinary audio in a web page, the processor 12 may detect whether an instruction for automatically playing an audio exists in a currently loaded web page; and when it is detected that the instruction for automatically playing an audio exists in the currently loaded web page, determine whether there is an audio being played. If the instruction for automatically playing an audio exists in the currently loaded web page, there is an ordinary audio to be automatically played.

Preferably, if the audio being played may include an audio of a WebRTC application, the processor 12 may further determine whether an opened web page includes a web page of the WebRTC application; if yes, determine, according to a signaling state of a predetermined port number corresponding to the web page of the WebRTC application, whether there is an audio of the WebRTC application being played in the web page of the WebRTC application, or determine, by determining a PeerState attribute of a Peerconnection object, whether there is an audio of the WebRTC application being played in the web page of the WebRTC application.

Preferably, if the audio being played is a second web page audio, the processor 12 may further: when the priority of the first web page audio is higher than the priority of the audio being played, control the audio player 17 to pause the second web page audio.

Preferably, the processor 12 may further: in the process of playing the first web page audio or the second web page audio, detect whether there is a local system audio started; and control the audio player 17 to pause the first web page audio or the second web page audio when there is a local system audio started and a priority of the local system audio is higher than the priority of the first web page audio or the second web page audio.

Preferably, the processor 12 may further determine whether a web page corresponding to the paused first web page audio or second web page audio is changed into an active web page; when a determination result is yes, display, through the display, an operation prompt to the user, where the operation prompt includes at least one of the following operation options: not playing the web page audio of the active web page and playing the web page audio of the active web page.

Preferably, the processor 12 may further: after the processor 12 controls the audio player 17 to intercept automatic display of the first web page audio, determine whether a web page corresponding to the first web page audio is an active web page; when a determination result is yes, display, through the display, an operation prompt to the user, where the operation prompt includes one or more of the following operation options: not playing the web page audio of the active web page, playing the web page audio of the active web page and pausing the web page audio being played, playing the web page audio of the active web page and decreasing the volume of the web page audio being played, and simultaneously playing the web page audio of the active web page and the audio being played.

Further, when the input device obtains an operation instruction that is given by the user according to the operation prompt or an operation instruction that is given by the user through a direct click, the processor 12 may further execute an operation corresponding to the operation instruction obtained by the input device.

The sequence numbers of the preceding embodiments of the present invention are merely for description purpose but do not indicate the preference of the embodiments.

It should be noted that when managing play of an audio, the audio management apparatus provided in the foregoing embodiments is merely described through an example in which the apparatus is divided into the foregoing functional modules. In the actual application, the foregoing functions may be assigned to and implemented by different functional modules as required, that is, the internal structure of the apparatus may be divided into different functional modules to implement all or part of the functions described above. In addition, the audio management apparatus provided in the foregoing embodiments and the embodiments of the audio management method belong to the same concept. For the details of the specific implementation process, reference may be made to the method embodiments, and the details are not described herein again.

Persons of ordinary skill in the art may understand that all or a part of the steps of the foregoing embodiments may be implemented through hardware, or may be implemented by a program instructing relevant hardware. The program may be stored in a computer readable storage medium. The storage medium may be a read-only memory, a magnetic disk, or an optical disk.

The foregoing descriptions are merely exemplary embodiments of the present invention, but are not intended to limit the present invention. Any modification, equivalent replacement, or improvement derived within the spirit and principle of the present invention shall fall within the protection scope of the present invention.

What is claimed is:

1. An audio management method, comprising:
   determining whether there is an audio being played in response to detecting that there is a first web page audio to be automatically played;
   performing a comparison to determine whether a priority of the first web page audio is lower than a priority of the audio being played when there is an audio being played;
   intercepting automatic play of the first web page audio in response to determining that the priority of the first web page audio is lower than the priority of the audio being played;
   playing the first web page audio in response to determining that the priority of the first web page audio is not lower than the priority of the audio being played; and
   wherein after the intercepting the automatic play of the first web page audio, the method further comprises:
      determining whether a web page corresponding to the first web page audio is changed into an active web page; and
      in response to determining that the web page corresponding to the first web page audio is changed into the active web page, displaying an operation prompt to a user, wherein the operation prompt comprises one or more of the following operation options: not playing the web page audio of the active web page, playing the web page audio of the active web page and pausing the web page audio being played, playing the web page audio of the active web page and decreasing the volume of the web page audio being played, and simultaneously playing the web page audio of the active web page and the audio being played.

2. The method according to claim 1, wherein the first web page audio to be automatically played is an audio of a Web real-time communication application, further comprising:
   detecting whether a signaling state of a predetermined port number corresponding to an opened web page of the Web real-time communication application is a predetermined state; and
   detecting whether the first web page audio to be automatically played is an ordinary audio in a web page and an instruction for automatically playing an audio exists in a currently loaded web page, wherein the ordinary audio is an audio that is different from the audio of the Web real-time communication application and is in the web page.

3. The method according to claim 1, wherein the audio being played comprises an audio of a Web real-time communication application, and wherein determining whether there is the audio being played comprises:
   determining whether an opened web page comprises a web page of the Web real-time communication application; and either
   determining, according to a signaling state of a predetermined port number corresponding to the web page of the Web real-time communication application, whether there is an audio of the Web real-time communication application being played in the web page of the Web real-time communication application in response to determining that the opened web page comprises the web page of the Web real-time communication application; or
   determining, by determining a PeerState attribute of a Peerconnection object, whether there is an audio of the Web real-time communication application being played in the web page of the Web real-time communication application in response to determining that the opened web page comprises the web page of the Web real-time communication application.

4. The method according to claim 3, wherein determining whether the opened web page comprises the web page of the Web real-time communication application comprises detecting whether a port number of a server connected to the opened web page is a predetermined port number or falls within a predetermined port number range, and wherein the opened web page comprises the web page of the Web real-time communication application in response to detecting that the port number of the server connected to the opened web page is the predetermined port number or falls within the predetermined port number range.

5. The method according to claim 1, further comprising: pausing a second web page audio when the priority of the first web page audio is higher than a priority of the second web page audio and when the audio being played is the second web page audio.

6. The method according to claim 5, further comprising:
   detecting whether there is a local system audio started in a process of playing the first web page audio or the second web page audio; and pausing the first web page audio or the second web page audio in response to detecting that there is a local system audio started and a priority of the local system audio is higher than the priority of the first web page audio or the second web page audio.

7. The method according to claim 6, further comprising: determining whether a web page corresponding to the paused first web page audio or second web page audio is changed into an active web page, and in response to determining that the web page corresponding to the paused first web page audio or second web page audio is changed into the active web page, displaying an operation prompt to a user, wherein the operation prompt comprises at least one of the following operation options: not playing the web page audio of the active web page and playing the web page audio of the active web page.

8. The method according to claim 1, wherein after the sending the operation prompt to the user, the method further comprises: obtaining an operation instruction that is given by the user according to the operation prompt and executing an operation corresponding to the obtained operation instruction.

9. The method according to claim 1, wherein the audio comprises a web page audio and a local system audio, wherein the web page audio comprises an audio of a Web real-time communication application, and wherein a priority of the audio of the Web real-time communication application is the highest amongst the web page audio and the local system audio.

10. An audio management apparatus, comprising:
at least one hardware processor;
a non-transitory computer-readable storage medium coupled to the at least one hardware processor and storing programming instructions for execution by the at least one hardware processor, wherein the programming instructions instruct the at least one hardware processor to:
detect whether there is a first web page audio to be automatically played;
determine whether there is an audio being played in response to detecting that there is a first web page audio to be automatically played;
perform a comparison to determine whether a priority of the first web page audio is lower than a priority of the audio being played in response to determining that there is an audio being played; and
intercept automatic play of the first web page audio; otherwise, play the first web page audio in response to determining that the priority of the first web page audio is lower than the priority of the audio being played;
determine whether a web page corresponding to the first web page audio is changed into an active web page after the automatic play of the first web page audio is intercepted; and
in response to determining that the web page corresponding to the first web page audio is changed into the active web page after the automatic play of the first web page audio is intercepted, display an operation prompt to a user,
wherein the operation prompt comprises one or more of the following operation options: not playing the web page audio of the active web page, playing the web page audio of the active web page and pausing the web page audio being played, playing the web page audio of the active web page and decreasing the volume of the web page audio being played, and simultaneously playing the web page audio of the active web page and the audio being played.

11. The apparatus according to claim 10, wherein the first web page audio comprises an audio of a Web real-time communication application, wherein the programming instructions instruct the at least one hardware processor to:
determine whether an opened web page comprises a web page of the Web real-time communication application, and
in response to determining that the opened web page comprises the web page of the Web real-time communication application, detect whether a signaling state of a predetermined port number corresponding to the web page of the Web real-time communication application is a predetermined state, wherein when the signaling state of the predetermined port number is the predetermined state, there is an audio of the Web real-time communication application to be automatically played, and wherein the programming instructions instruct the at least one hardware processor to determine whether there is an audio being played when the signaling state of the predetermined port number is the predetermined state.

12. The apparatus according to claim 10, wherein the first web page audio comprises an ordinary audio in a web page, and the programming instructions instruct the at least one hardware processor to:
detect whether an instruction for automatically playing an audio exists in a currently loaded web page, wherein when the instruction for automatically playing an audio exists in the currently loaded web page, there is an ordinary audio to be automatically played, and the ordinary audio is an audio that is different from an audio of a Web real-time communication application and is in the web page; and
determine whether there is an audio being played in response to detecting that the instruction for automatically playing an audio exists in the currently loaded web page.

13. The apparatus according to claim 10, wherein the audio being played comprises an audio of a Web real-time communication application, and wherein the programming instructions instruct the at least one hardware processor to:
determine whether an opened web page comprises a web page of the Web real-time communication application; and
in response to determining that the opened web page comprises the web page of the Web real-time communication application, either determine, according to a signaling state of a predetermined port number corresponding to the web page of the Web real-time communication application, whether there is an audio of the Web real-time communication application being played in the web page of the Web real-time communication application, or determine, by determining a PeerState attribute of a Peerconnection object, whether there is an audio of the Web real-time communication application being played in the web page of the Web real-time communication application.

14. The apparatus according to claim 13, wherein the programming instructions instruct the at least one hardware processor to:
detect whether a port number connected to the opened web page is a predetermined port number or falls within a predetermined port number range, and wherein when the port number connected to the opened web page is the predetermined port number or falls within the predetermined port number range, the opened web page comprises the web page of the Web real-time communication application.

15. The apparatus according to claim 10, wherein when the audio being played is a second web page audio, the programming instructions instruct the at least one hardware processor to pause the second web page audio when the priority of the first web page audio is higher than a priority of the second web page audio.

16. The apparatus according to claim 15, wherein the programming instructions instruct the at least one hardware processor to:
   in a process of playing the first web page audio or the second web page audio, detect whether there is a local system audio started; and
   pause the first web page audio or the second web page audio in response to detecting that there is a local system audio started and a priority of the local system audio is higher than either the priority of the first web page audio or the priority of the second web page audio.

17. The apparatus according to claim 16, wherein the programming instructions instruct the at least one hardware processor to:
   determine whether a web page corresponding to the paused first web page audio or second web page audio is changed into an active web page; and
   in response to determining that the web page corresponding to the paused first web page audio or second web page audio is changed into the active web page, display an operation prompt to a user,
   wherein the operation prompt comprises at least one of the following operation options: not playing the web page audio of the active web page and playing the web page audio of the active web page.

18. The apparatus according to claim 17, wherein the programming instructions instruct the at least one hardware processor to:
   obtain an operation instruction that is given by the user according to the operation prompt; and
   execute an operation corresponding to the operation instruction obtained.

19. The apparatus according to claim 10, wherein the audio comprises a web page audio and a local system audio, wherein the web page audio comprises an audio of a Web real-time communication application, and wherein a priority of the audio of the Web real-time communication application is the highest amongst the web page audio and the local system audio.

* * * * *

UNITED STATES PATENT AND TRADEMARK OFFICE
CERTIFICATE OF CORRECTION

PATENT NO. : 9,720,643 B2
APPLICATION NO. : 14/140871
DATED : August 1, 2017
INVENTOR(S) : Yahui Wang et al.

Page 1 of 1

It is certified that error appears in the above-identified patent and that said Letters Patent is hereby corrected as shown below:

In the Claims

In Column 26, In Line 18 (approx.), In Claim 18, delete "instruction obtained." and insert -- instruction. --, therefor.

Signed and Sealed this
Twenty-first Day of November, 2017

Joseph Matal
*Performing the Functions and Duties of the
Under Secretary of Commerce for Intellectual Property and
Director of the United States Patent and Trademark Office*